United States Patent [19]
Freismuth et al.

[11] Patent Number: 4,776,313
[45] Date of Patent: Oct. 11, 1988

[54] COMPACT INTEGRATED-ENGINE INDUCTION AIR/FUEL SYSTEM

[75] Inventors: Richard J. Freismuth, Mount Clemens; James H. Jones, Farmington Hills; Dale M. Mayol, Belleville, all of Mich.

[73] Assignee: Ford Motor Company, Dearborn, Mich.

[21] Appl. No.: 56,020

[22] Filed: Jun. 1, 1987

[51] Int. Cl.$^4$ ............................................. F02M 55/00
[52] U.S. Cl. .................. 123/470; 123/52 M; 123/468
[58] Field of Search ............ 123/468, 469, 470, 471, 123/472, 52 M, 52 MV

[56] References Cited
U.S. PATENT DOCUMENTS

| | | | |
|---|---|---|---|
| 4,556,034 | 12/1985 | Anklam et al. | 123/470 |
| 4,622,931 | 11/1986 | Wickramasuriya | 123/190 A |
| 4,644,911 | 2/1987 | Hidaka et al. | 123/52 M |
| 4,649,871 | 3/1987 | Hatamura et al. | 123/52 MV |

FOREIGN PATENT DOCUMENTS

| | | | |
|---|---|---|---|
| 57-97064 | 6/1982 | Japan | 123/470 |
| 57-181964 | 11/1982 | Japan | 123/52 M |
| 59-215960 | 12/1984 | Japan | 123/470 |

Primary Examiner—Tony M. Argenbright
Assistant Examiner—Eric R. Carlberg
Attorney, Agent, or Firm—Robert E. McCollum; Clifford L. Sadler

[57] ABSTRACT

An essentially unitary all plastic intake manifold has two essentially L-shaped sections facing one another to form a U-shaped assembly, the upper section including an air throttle body integral with an air plenum in turn integral with a plurality of laterally spaced tuned manifold runners, the lower section having an equal number of laterally spaced manifold runners connected to engine cylinder head intake ports, and a fuel system formed integral with the lower runners and including a fuel pressure regulator and fuel supply and return lines serially connecting fuel injector receiving cups providing a bottom feed of fuel to the injectors and a constant purge of fuel from the cups, for efficient engine operation.

9 Claims, 5 Drawing Sheets

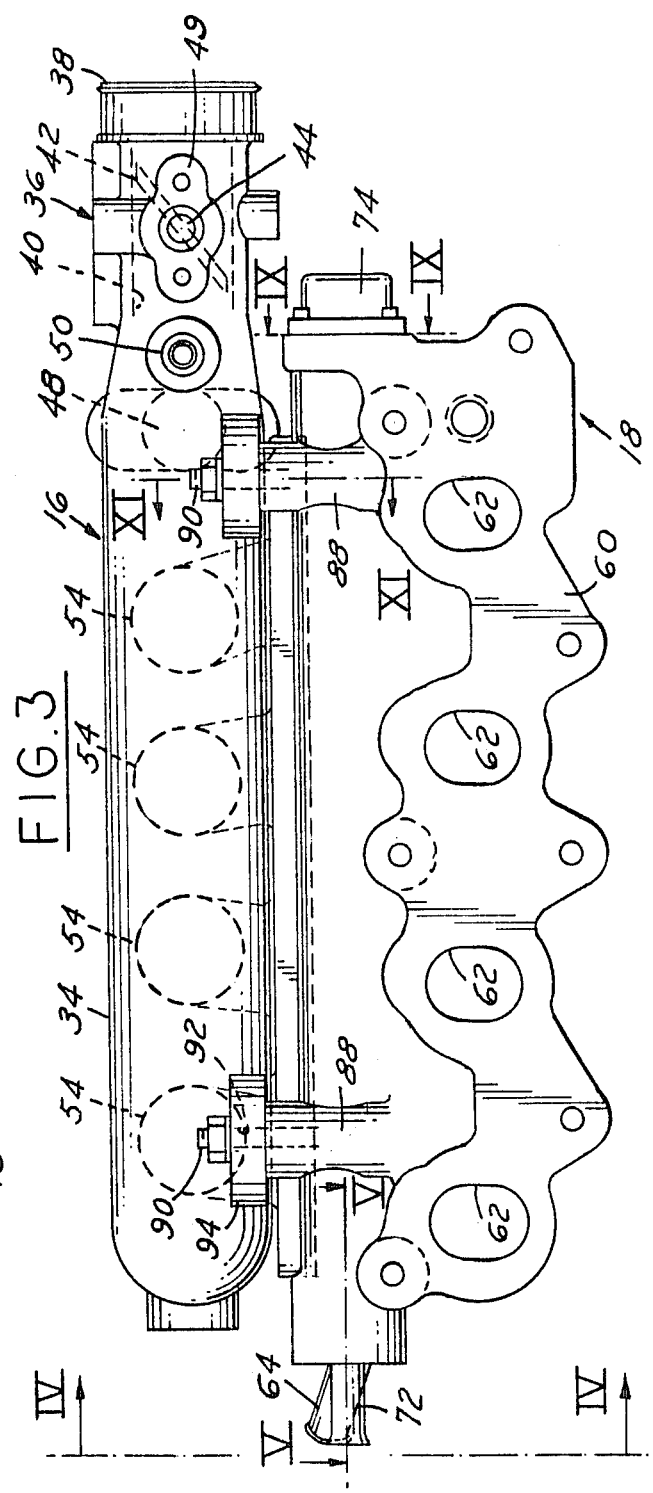
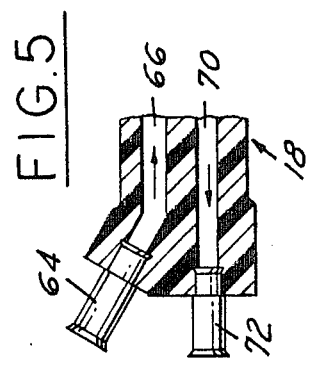
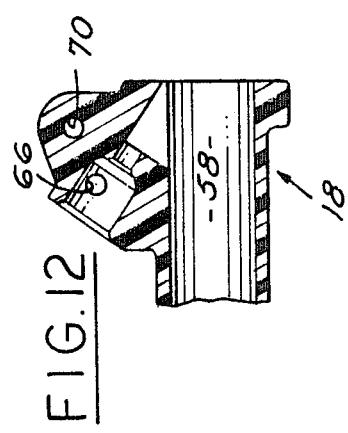

COMPACT INTEGRATED ENGINE INDUCTION AIR/FUEL SYSTEM

This invention relates in general to an induction system for an automotive type internal combustion engine. More particularly, it relates to a two-piece completely plastic engine intake manifold with tuned runners, an air throttle body, fuel injector receiving cups and fuel supply and return channels or conduits, all integrally formed therewith as a unitary assembly to provide a complete self-contained engine induction system.

Tuned intake manifolds with individual runners secured to the engine cylinder head are known. However, in most cases, the fuel supply rails and other components of the fuel system are made of metal and are add-on items that are separately attached to the intake manifold and project outwardly therefrom. This results in a more costly fuel injection system, a cumbersome one as to packaging in the engine compartment and as to servicing, and also one subject to damage more easily than one that is integrally formed as a part of the manifold.

It is a primary object of the invention, therefore, to provide a two-piece plastic molded engine intake manifold having upper and lower sections of tuned runners of equal length that are essentially parallel to one another, the upper runners being formed integral with an air plenum having an air throttle body integral therewith, the lower section having flange means for attachment to the engine cylinder head and having formed with the manifold runners an integral fuel system including fuel supply and return channels feeding fuel injector receiving cups also integrally formed as a part of the manifold.

U.S. Pat. No. 4,622,9831, Wickramasuriya, shows a one-piece intake manifold having an air plenum and air throttle body integral with a plurality of essentially parallel tuned individual runners. However, the fuel injector receiving cups are separate from the manifold, and there are no fuel supply and return channels formed as a part therewith to define a complete self-contained integral induction system.

Another object of the invention is to provide a plastic intake manifold of a construction that includes an integral fuel system with built-in fuel supply and return channels and fuel injector cups that receive bottom feed type fuel injectors therein, the cups being serially arranged with respect to fuel flow to provide constant purging of the fuel from the injectors, not only to cool the injectors but prevent undue vaporization. The use of a plastic fuel rail as well as a plastic manifold also provides a greater thermal isolation of the fuel with less conduction of heat from the cylinder head than the conventional heat conducting aluminum or cast iron rail or manifold.

Other objects, features and advantages of the invention will become more apparent upon reference to the succeeding detailed description thereof, and to the drawings illustrating the preferred embodiment thereof; wherein:

FIG. 3 is an enlarged view taken on a plane indicated by and viewed in the direction of the arrows III—III of FIG. 1;

FIG. 5 is a cross-sectional view taken on a plane indicated by and viewed in the direction of the arrows V—V of FIG. 4;

FIG. 12 is a cross-sectional view taken on a plane indicated by and viewed in the direction of the arrows XII—XII of FIG. 6.

Figure 2:
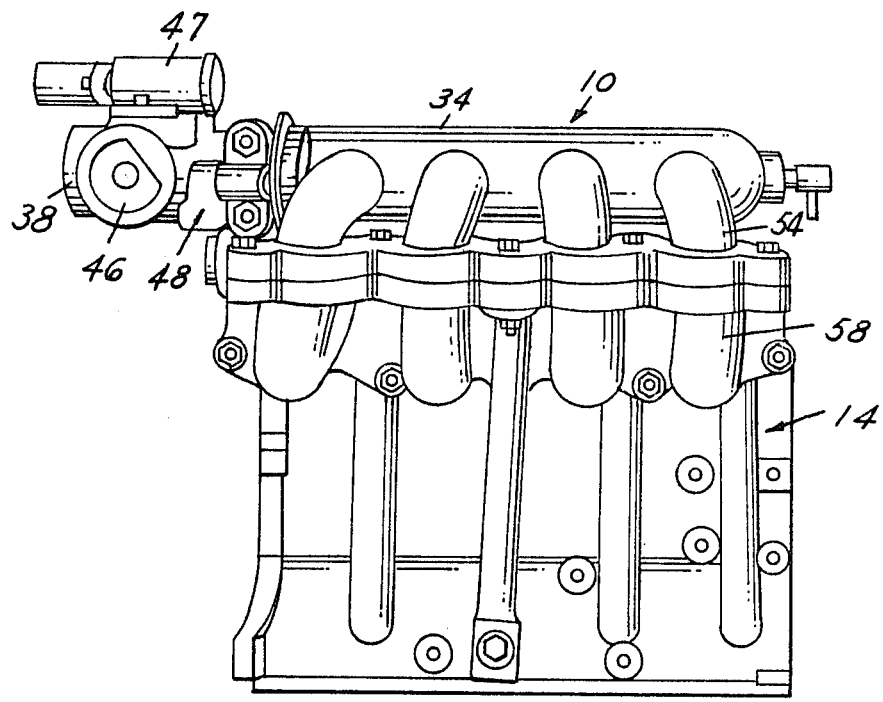
FIG. 2 is a side elevational view taken on a plane indicated by and viewed in the direction of the arrows II—II of FIG. 1.
Figure 1:
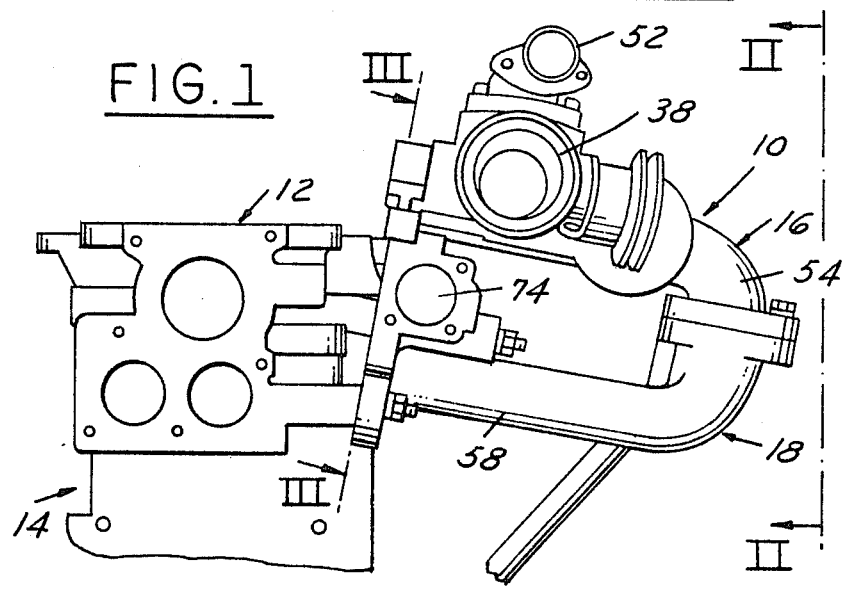
FIG. 1 is an end elevational view of an engine induction system embodying the invention.

FIGS. 1 and 2 show the induction system 10 of the invention mounted on and/or attached to the cylinder head 12 of an automotive type internal combustion engine. The latter includes an engine block 14 having in this case four individual in-line cylinders receiving the usual pistons, not shown. Other details of the engine per se will not be given since they are known and believed to be unnecessary for an understanding of the invention. Suffice it to say that the induction system 10 delivers air and fuel to the cylinder head 12 for delivery into each of the combustion chambers of the engine in the usual manner.

Figure 4:
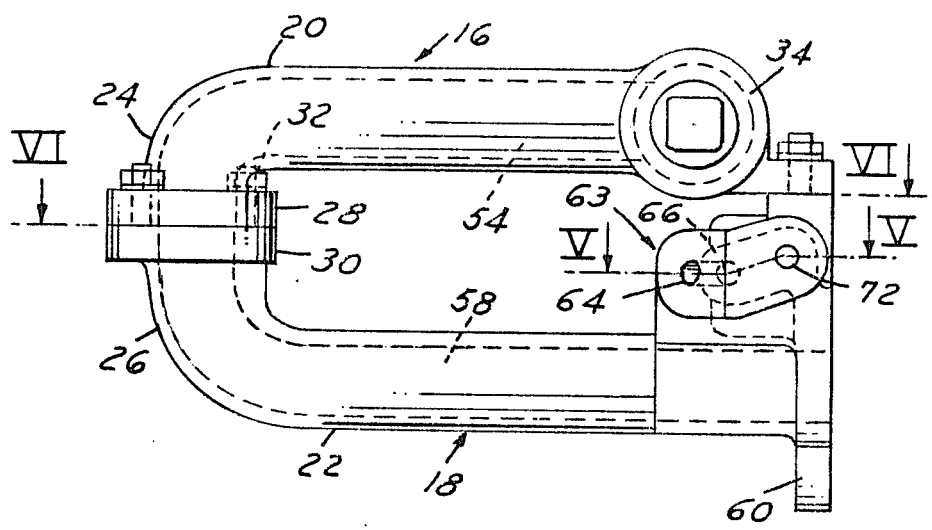
FIG. 4 is an enlarged end elevational view taken on a plane indicated by and viewed in the direction of the arrows IV—IV of FIG. 3.
Figure 9:
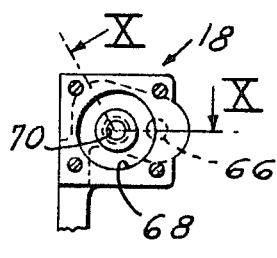
FIGS. 9 and 11 are cross-sectional views of details taken on planes indicated by and viewed in the direction of the arrows IX—IX and XI—XI of FIG. 3.

Induction system 10 is shown as an essentially U-shaped completely plastic assembly. It consists of two essentially symetrical parts facing one another, an upper air intake manifold section 16, and a lower fuel supply intake manifold section 18. The sections are shown more clearly and in more detail in FIGS. 3, 4, 6 and 8. As best seen in FIG. 4, each section 16,18 is essentially L-shaped in elevation with a horizontal base portion 20, 22 and a right angled vertical end connecting portion 24, 26 integral therewith. The mating end portions 24,26 are each provided with mating flanges 28,30 for joinder by means of suitable bolts 32, with a gasket(not shown) between. As stated previously, the assembly thus is essentially a U-shaped two-piece unit provided with suitable means to be described to provide an integral complete induction system.

FIG. 3 is an end elevational view of the induction system separated from the cylinder head 12 in FIG. 1, for clarity. It shows the upper section 16 as including an air plenum or chamber 34 (see also FIG. 8) having integral at one end thereof an air throttle body 36. The latter includes a fresh air inlet 38 that would be connected to the clean air side of a conventional engine air cleaner, not shown, for the induction of fresh air at essentially atmospheric pressure into the plenum 34. The air throttle body 36 includes an induction passage 40, the flow of air through which is controlled by a throttle valve 42. The latter is fixed to a shaft 44 mounted for rotation in the walls of the throttle body 36. The valve would be movable from the closed throttle valve position shown blocking air flow into the plenum 34 to an essentially horizontal wide-open throttle position allowing maximum air flow to the plenum.

FIG. 2 shows the throttle body as including a pulley 46 for moving the throttle valve 42, and an air by-pass valve housing 47. The figure also shows an exhaust gas recirculation (EGR) valve assembly 48. FIG. 3 shows the throttle body having a throttle valve position sensor mounting pad 49, and a crankcase ventilating tube mounting 50.

Figure 8:
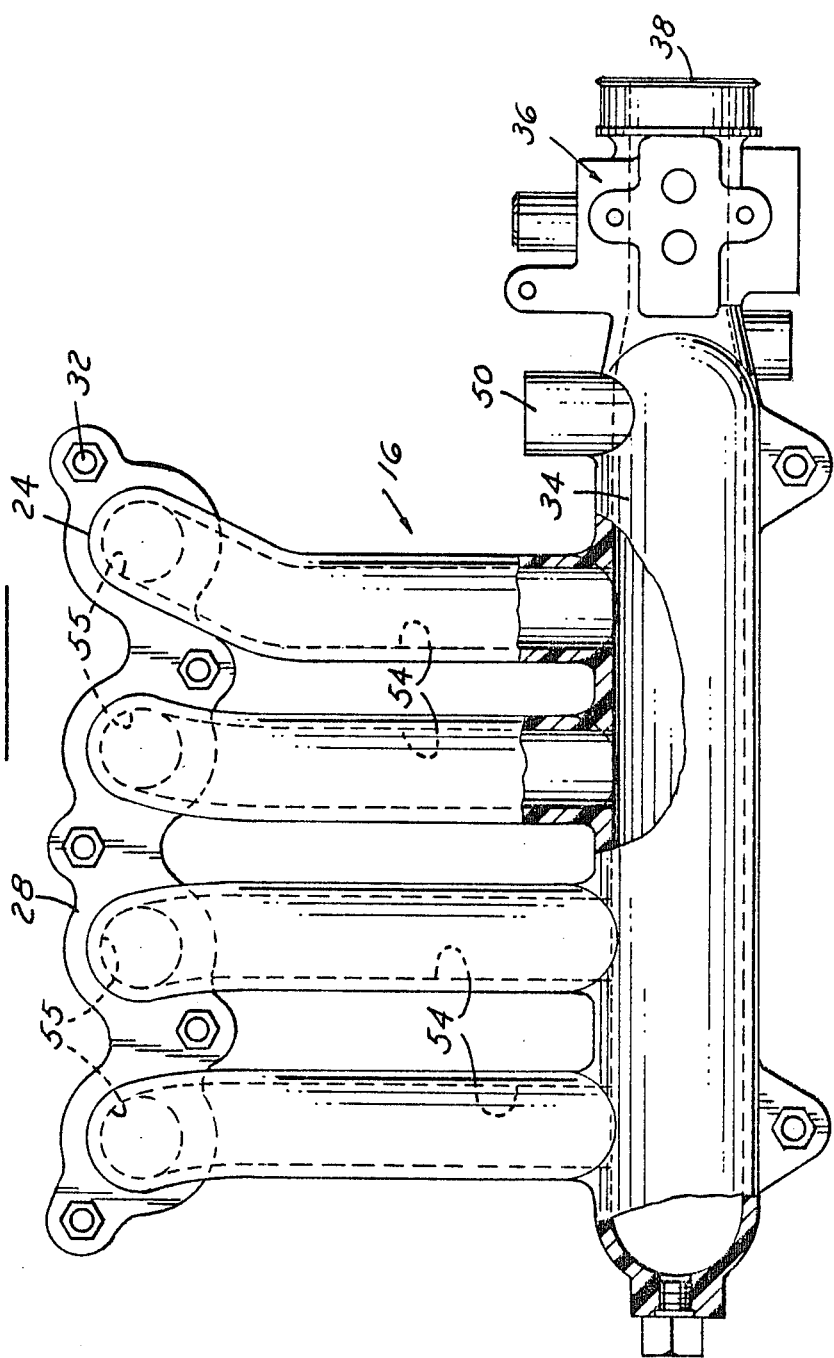
FIG. 8 is a top plan view of the upper section of the induction system embodying the invention.

Turning now to both FIGS. 3 and 8, plenum 34 has integral therewith and at right angles thereto four individual hollow L-shaped intake manifold runners or logs 54, all of essentially equal lengths and lateral spacing, and each directing the air from plenum 34 to an individual engine cylinder. In this case, each of the runners is integral with a flange 28 previously described in connection with FIG. 4 and aligned with holes 55 in the flange for mating attachment with a similar flange 30 shown in FIG. 6 integral with the lower section 18. The runners 54, as well as the runners 58 of the lower section to be described, are tuned to respond to a particular resonant frequency of the engine for the most efficient induction of air and fuel into the engine, in a known manner.

Figure 10:
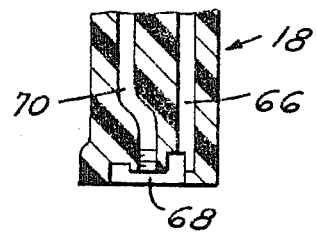
FIG. 10 is a cross-sectional view taken on a plane indicated by and viewed in the direction of the arrows X—X of FIG. 9.
Figure 11:
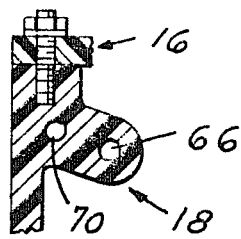
Figure 6:
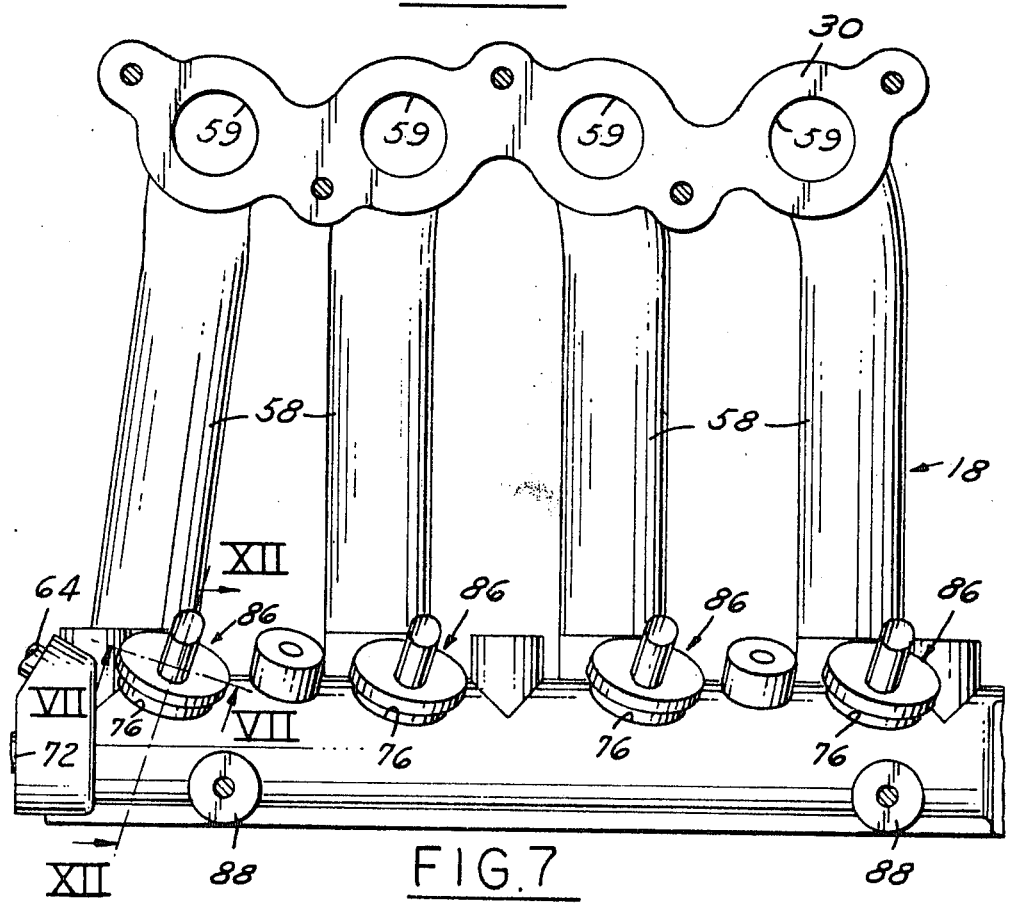
FIG. 6 is a plan view of the lower portion or section of the intake manifold taken on a plane indicated by and viewed in the direction of the arrows VI—VI of FIG. 4.
Figure 7:
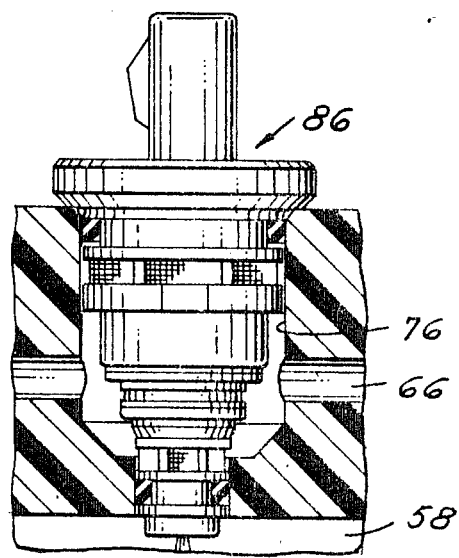
FIG. 7 is an enlarged cross-sectional view of a detail taken on a plane indicated by and viewed in the direction of the arrows VII—VII of FIG. 6.

Turning now to FIG. 6, the lower section 18, similar to the upper section 16, contains the connecting flange 30 from which project individually the four tuned L-shaped hollow runners 58 of equal lengths from openings 59 in flange 30. As best seen in FIGS. 3, 4 and 6, the lower ends of the runners 58 are joined integral with the cylinder head mounting flange 60 and aligned with individual openings 62 for each runner. Also integrally formed with the runners at this point is a fuel supply and return system indicated in general at 63 that includes fuel injector receiving cups as well as a pressure regulator mounting pad and other essentials to form a complete fuel system. More particularly, molded together with the ends of the runners is a housing that contains a fuel supply inlet line 64 that connects with a channel 66 (FIG. 7). The latter extends the horizontal length of the housing shown in FIG. 3 to the opposite end, at which point is mounted a pressure regulator, not shown in FIG. 10 but indicated in general at 74 in FIG. 3. The regulator controls in a known manner the spillage of fuel above a predetermined pressure level to an outlet 68 (FIG. 10) connected to a fuel return line 70 that extends the length of the housing to an outlet 72 (FIG. 3).

As stated previously, the integral fuel system 63 is formed with four individual in this case angled fuel injector receiving cups 76 shown more clearly in FIGS. 7 and 12. Each cup recess is essentially of an annular/-bell-like shape that is intersected at diametrically opposite sides by the inlet or supply line 66. The cups, therefore, are serially connected to each other by the supply line. The lower portion of each cup recess opens directly into the opening 62 in the lower section mounting flange 60 for the direct angled injection of fuel into the intake port (not shown) of the cylinder head. An injector 86 would be sealingly secured into each of the cup recesses 76.

Completing the construction, in addition to the flanges 28,30 for connecting the upper and lower sections of the manifold, the two sections are joined by bolts 90 that project from bosses 88 in the lower section to pass through bosses 92 projecting from the plenum 34.

From the foregoing, it will be clear that the invention provides an integral assembly of a two-piece plastic engine induction system consisting of an upper section having an air plenum integral with an air throttle body and a plurality of individual equal length tuned runners, joined to a lower section having integral therewith an identical number of tuned individual intake manifold runners or logs integral at their opposite ends with a fuel system that includes a fuel supply or inlet line supplying fuel to and serially connecting individual fuel injection receiving cups, and a separate fuel return line for return of fuel to a sump.

It will also be recognized that in view of the fact that the fuel injector receiving cups are serially connected by the fuel inlet or supply line near the bottom portion of the fuel injectors, that the fuel will be constantly or continuously purged from each fuel injector cup. Furthermore, the fuel injectors being bottom fed rather than from a fuel line or rail located outside of the manifold and supplying it from above not only cools the injector but reduces fuel vaporization and thereby improves the operation of the fuel injectors. The use of a plastic manifold and especially a plastic fuel rail further insulates the fuel from the hot cylinder head section of the engine to reduce hot fuel problems.

While the invention has been shown and described in its preferred embodiment, it will be clear to those skilled in the arts to which it pertains that many changes and modifications may be made thereto without departing from the scope of the invention.

We claim:

1. A unitary compact all plastic tuned engine intake manifold comprising upper and lower essentially symmetrical L-shaped sections facing one another and together forming a U-shaped assembly, each section including a plurality of laterally spaced L-shaped essentially parallel runners of equal length, the upper section having an air intake plenum common to all the runners and connected integrally therewith for supplying air individually thereto, the lower section having engine attaching flange means integral therewith with port means aligned with and corresponding in number to the number of runners for the discharge of air therethrough, and a fuel system integral with the lower section including a housing having a plurality of serially fuel connected fuel injector receiving cup means communicating with each of the port means for discharging thereinto fuel intermittently discharged from fuel injectors adapted to be inserted into each of the cup means, and fuel supply and return lines formed integral with the housing for supplying fuel to the cups to supply the injectors.

2. A manifold as in claim 1, wherein the fuel system includes a fuel supply channel enclosed by the housing communicating concurrently with each of the cup means by means of an annulus, the cup means having a fuel inlet and outlet on opposite sides for supplying fuel to the fuel injectors and for constantly purging the fuel from the cup means, the plastic manifold constituting insulating means reducing the transfer of heat from the engine to the fuel.

3. A manifold as in claim 1, wherein each runner consists of a horizontally extending leg portion joined to a vertical base portion at right angles thereto, and flange means for joining the base portions of the upper and lower sections together.

4. A manifold as in claim 1, wherein the upper section includes an air throttle body integrally formed on an air inlet end of the plenum for controlling air flow to the plenum.

5. A manifold as in claim 1, wherein the fuel system and lower section includes a fuel pressure regulator integral therewith.

6. An integral self-contained fuel injection supply and return system for an automotive type internal combustion engine having a cylinder head and a plurality of individual air intake manifold runners connnected to air inlet passages in the cylinder head, comprising, a housing contiguous on one side with the runners and connected to the cylinder head on the other side, the housing containing a plurality of laterally spaced air channels connecting the runners to the cylinder head and a plurality of laterally spaced fuel injector receiving seats, a continuous fuel supply inlet channel extending through the housing and seats connecting the seats in a series flow relationship for a continuous flow of fuel through and past the seats, and a fuel return channel also passing through the housing and operatively connected to the inlet channel for the vent of fuel from the housing.

7. A system as in claim 6, including a presure regulator valve on the housing connecting the inlet and return channels.

8. A system as in claim 6, wherein the inlet supply channel communicates with each of the seats by means of an annulus, the seats each having a fuel inlet and outlet on opposite sides for supplying fuel to injectors adapted to be inserted into the seats and for constantly purging the fuel from the seats.

9. An integral self-contained fuel injection supply and return system located between the intake manifold and cylinder head of an automotive type internal combustion engine, the manifold having a plurality of individual air intake manifold runners connected to a corresponding number of individual air inlet passages in the cylinder head, the system comprising, a housing integral on one side with the runners as an integral extension thereof and connected to the cylinder head on the other side, the housing containing a plurality of laterally spaced air channels corresponding in number to those of the passages and connecting the runners to the cylinder head, the housing also containing a plurality of laterally spaced fuel injector receiving seats associated with said channels, a continuous fuel supply inlet channel extending through the housing and seats connecting the seats in a series flow relationship for a continuous flow of fuel through and past the seats, and a fuel return channel operatively connected to the inlet channel for the vent of fuel from the housing.

* * * * *